United States Patent
Cattrone et al.

(10) Patent No.: US 8,094,344 B2
(45) Date of Patent: Jan. 10, 2012

(54) OPTIMUM NOISE FILTER SETTING FOR A SCANNER IN A CLOSED LOOP SYSTEM

(75) Inventors: Paul Cattrone, Pleasant Hill, CA (US); Hiroshi Tomita, Palo Alto, CA (US); Vivek Pathak, Mountain View, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 792 days.

(21) Appl. No.: 11/364,439

(22) Filed: Feb. 28, 2006

(65) Prior Publication Data

US 2007/0201106 A1    Aug. 30, 2007

(51) Int. Cl.
*G06T 5/00* (2006.01)

(52) U.S. Cl. ........ 358/3.26; 358/1.9; 358/463; 358/448; 382/260; 382/254; 382/275

(58) Field of Classification Search .................. None
See application file for complete search history.

(56) References Cited

U.S. PATENT DOCUMENTS

| | | | |
|---|---|---|---|
| 5,113,445 A | 5/1992 | Wang | |
| 5,760,382 A | 6/1998 | Li et al. | |
| 6,035,065 A * | 3/2000 | Kobayashi et al. | 382/201 |
| 6,313,924 B2 * | 11/2001 | Kanamori | 358/1.9 |
| 2003/0179944 A1 | 9/2003 | Gindele et al. | |
| 2006/0092444 A1 * | 5/2006 | Nakamura et al. | 358/1.9 |
| 2006/0279798 A1 * | 12/2006 | Rudolph et al. | 358/403 |

FOREIGN PATENT DOCUMENTS

| | | |
|---|---|---|
| JP | 10-214336 | 8/1998 |
| JP | 2002-051210 | 2/2002 |

OTHER PUBLICATIONS

Japanese Office Action, mailed on Nov. 1, 2011, in a counterpart Japanese patent application, No. JP2007-046714.

* cited by examiner

*Primary Examiner* — Benny Tieu
*Assistant Examiner* — Paul F Payer
(74) *Attorney, Agent, or Firm* — Chen Yoshimura LLP

(57) ABSTRACT

Disclosed is a method for determining optimum noise filter setting to be used by a scanner in a system including a printer and a detector forming a closed loop system. A test image including a plurality of horizontal lines, vertical lines, slanted lines and dots are printed using the printer and scanned back using the scanner. The scanned test image data is compared to the input test image data representing the test image, and based on such comparison, the optimum noise filter setting for the printer/scanner pair is determined and stored for future use. This method is particularly useful for printing barcodes having high data capacity.

4 Claims, 4 Drawing Sheets

31

32

33

OPTIMUM NOISE FILTER SETTING FOR A SCANNER IN A CLOSED LOOP SYSTEM

BACKGROUND OF THE INVENTION

1. Field of the Invention

This invention relates to a method used in a digital scanner, and in particular, it relates to a method and apparatus for setting optimum noise filter for a scanner used in a closed loop system.

2. Description of the Related Art

Barcodes are a form of machine-readable symbology for recording digital information. One-dimensional and two-dimensional black and white barcodes have been widely used. Color barcodes have also been proposed. One-dimensional barcodes typically contain a series of parallel lines of varying widths. Two-dimensional barcodes may contain stacked rows of parallel lines of varying widths, or a two-dimensional arrangement of tiles. To increase data capacity and reduce the physical size of barcodes, it is desirable to decrease the width of the lines or the size of the tiles in a barcode. Reduction in width or size of the barcode lines or tiles, however, is limited by various hardware and software factors. One limiting factor is the nominal spatial resolution of the printer that prints the barcode and the scanner that scans the barcode. Another type of limiting factors are the inherent noises of the printer and the scanner, including toner scattering in the printer, settings of the imaging algorithm in the scanner, etc. Toner scattering is a sort of unintended toner adhesion in the vicinity of printed features or a background area that should be white, and may cause blurring of fine lines, fine points and sharp edges. Digital scanners typically are equipped with software noise filters to digitally filter out certain features in the scanned data that are considered noise. For example, a noise filter may remove isolated black pixels in an otherwise white area as noise. Such noise filters may use various models to model noises in printers and attempt to remove the noises based on the noise model.

Another source of noise or artifacts in scanning a barcode with fine lines or small tile sizes is skewing in the printer. When the size of the barcode elements (lines or tiles) are as small as the size of a few printed dots, skewing may have a large effect on the detected shape or size of the barcode elements.

SUMMARY OF THE INVENTION

The present invention is directed to a method that detects the noise sources in a printer and adjusts the correction parameters in a scanner for a printer/scanner pair used in a closed loop system to provide a barcode or symbology having maximum data capacity and readability for the given printer/scanner pair.

An object of the present invention is to provide a barcode or symbology which can be printed and scanned back reliably using a given printer/scanned hardware system and provide maximum data capacity.

Additional or separate features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for determining optimum noise filter setting for use by a scanner in a system including a printer for printing images and a scanner for scanning images printed by the printer, which includes: (a) obtaining input test image data representing a test image; (b) printing the test image; (c) scanning the printed test image to generate scanned test image data; (d) based on the scanned test image data and the input test image data, determining an optimum noise filter setting for the scanner to be used for scanning images printed by the printer; and (e) storing the optimum noise filter setting.

In another aspect, the present invention provides a method for scanning a printed image, which includes: (a) identifying a class of printers used to print the image; (b) retrieving optimum noise filter setting specific for the class of printers; and (c) scanning the printed image using the optimum noise filter setting.

In yet another aspect, the present invention provides a system for scanning printed images, which includes: a scanner for scanning a test image printed on a recording medium to generate scanned test image data, the test pattern having been printed based on input test image data; and a controller for determining an optimum noise filter setting based on the scanned test image data and the input test image data.

It is to be understood that both the foregoing general description and the following detailed description are exemplary and explanatory and are intended to provide further explanation of the invention as claimed.

DETAILED DESCRIPTION OF THE PREFERRED EMBODIMENTS

Due to various hardware factors, the noise characteristics of different printers are often different. Similarly, the noise filters and other aspects of the scanning algorithm of different scanners are often different. For a particular class of printers, such as printers of the same model from the same manufacturer, however, the noise characteristics are much more consistent among different individual devices. Accordingly, embodiments of the present invention provide a method that allows an optimum setting of the noise filter for a combination of a given printer and a given scanner, or a given class of printers and a given class of scanners, sometimes referred to as a closed loop system, to provide a barcode having maximum data capacity and readability for the given printer and scanner combination. In other words, the method maximizes data capacity of a barcode by limiting the choices of hardware.

Figure 1:
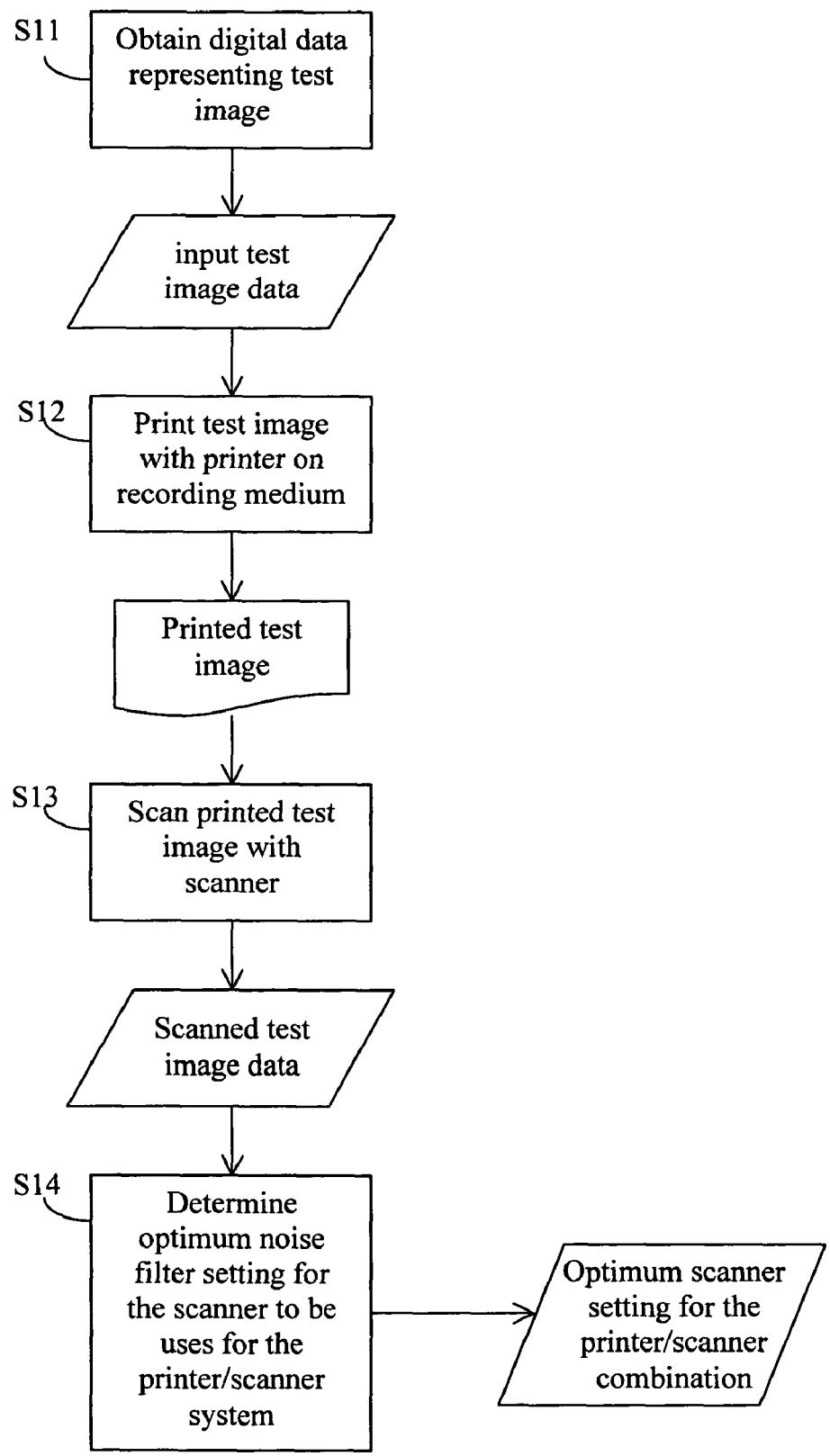
FIG. 1 is a flowchart illustrating a method for determining optimum noise filter setting for a printer and scanner combination according to an embodiment of the present invention.
Figure 3A:
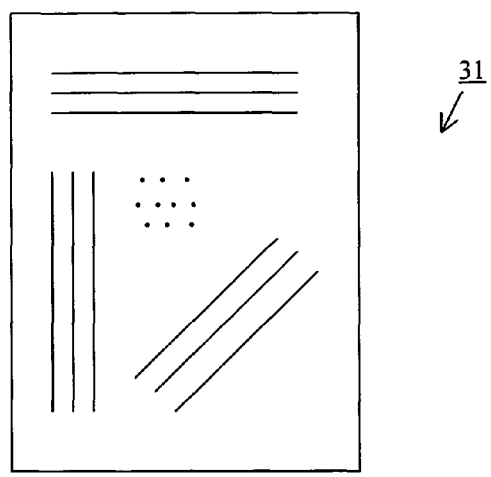
FIGS. 3(a)-(c) illustrate a test image, the test image having been printed and scanned, and the noise in the scanned test image.
Figure 3B:
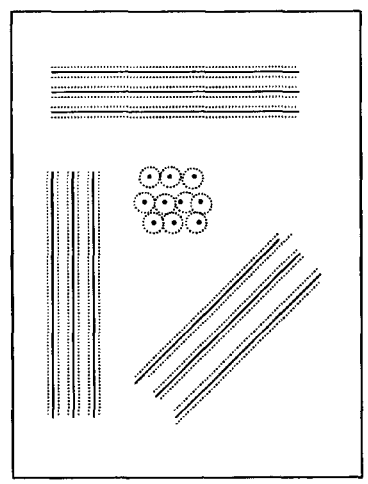
Figure 3C:
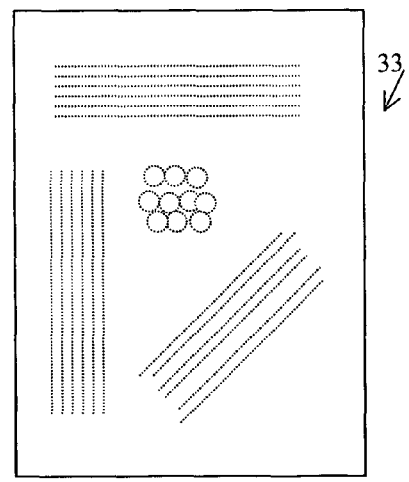

FIG. 1 illustrates a method according to an embodiment of the present invention for determining optimum noise filter setting for a printer and scanner combination. First, digital data representing a test image (input test image data) is obtained (step S11). As shown in FIG. 3(a), the test image 31 preferably contains a plurality of line patterns and dot patterns. In particular, the test pattern preferably includes a set of horizontal lines, a set of vertical lines, and a set of slanted lines. In addition, the test image preferably includes test patterns characteristic to the barcodes intended to be used, such as small rectangles or lines of varying widths. The input test image data is submitted to the printer to print the test image on a recording medium (step 12). The printed test image is then scanned using a scanner to generate scanned test image data (step S13). The printer and the scanner, with their hardware configurations and software settings, form a closed loop system. The scanned test image 32 will contain noises introduced by this closed loop system, as schematically indicated in FIG. 3(b). The scanned test image data (the output of the closed loop system) is compared with the input test image data (the input to the closed loop system). FIG. 3(c) schematically illustrates the result of subtracting the input test image from the scanned test image, which represents the noise pattern. This comparison will reflect the characteristics of the noises introduced by this closed loop system, and can be analyzed to determine the optimum noise filter setting for the scanner to be used for the printer/scanner system (step S14).

Optionally, the test image may be printed multiple times and each printed test image is scanned, and the optimum noise filter setting is determined in step S14 using the multiple scanned test images. This may help to reduce the influence of random noises not repeated in the multiple printed images.

A method of determining the optimum noise filter setting (step S14) is described with reference to FIG. 2. The scanner is initially set to a low noise filter setting and the filtered data is compared to the input test image data (step S21). The noise filter setting is then increased (step S22). Note that the parameters that describe noise filter settings may vary for different scanners; as used here, a "lower" (or "higher") noise filter setting generally refers to a setting that filters out less (or more) noise. The noise filtering is applied to the scanned data and the filtered data is again compared with the input test image data (step S23). If the higher noise filter setting results in improved noise reduction ("Y" in step S24), steps S22-S24 are repeated with higher noise filter setting. If no improvement in noise reduction is seen ("N" in step S24), the previous noise filter setting is selected as the optimum noise filter setting (step S25). The optimum noise filter setting may be stored in the scanner for future use.

Figure 2:
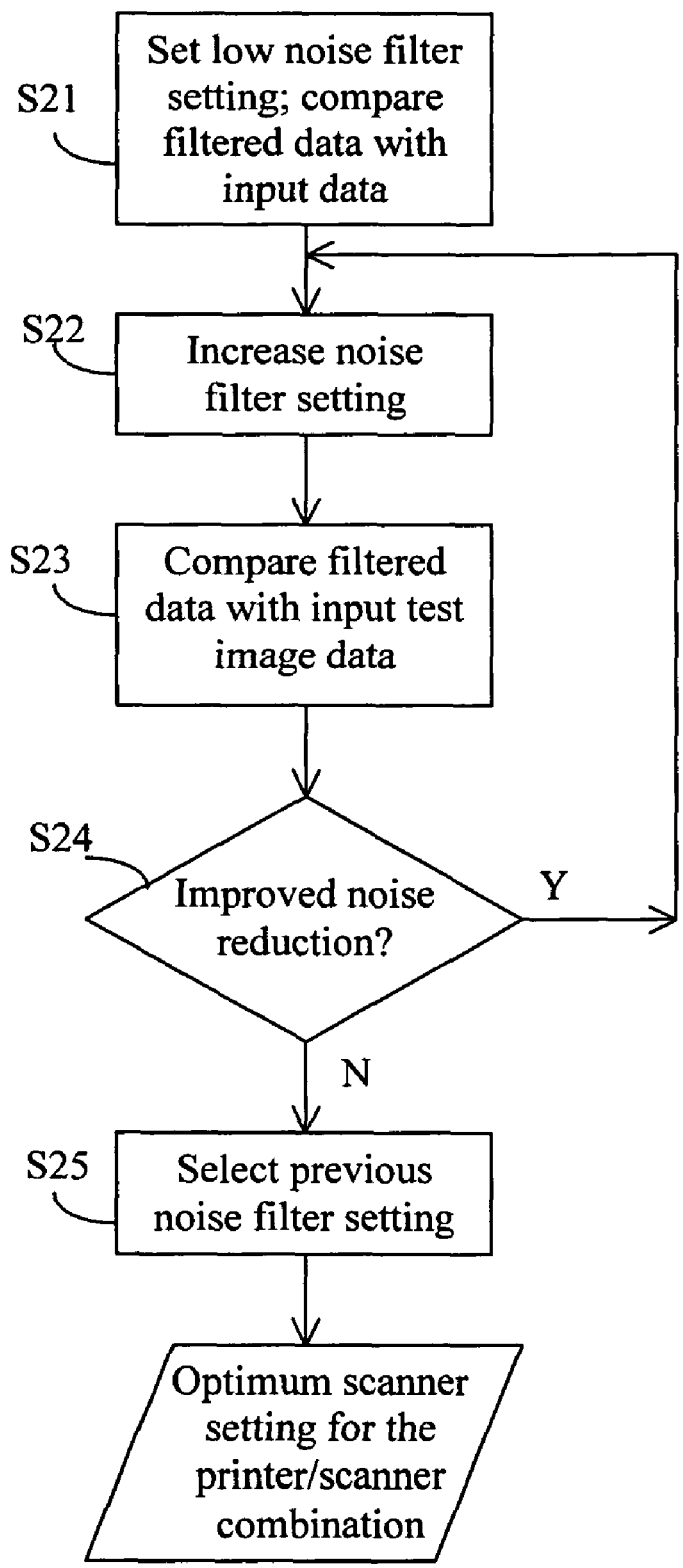
FIG. 2 is a flowchart illustrating an algorithm for determining optimum noise filter setting according to an embodiment of the present invention.

The method shown in FIG. 2 is one example of a method for determining the optimum noise filter setting based on the scanned test image data. Alternatively, the optimum noise filter setting may be calculated from the noise pattern using a noise filter model.

The optimum noise filter setting determined by the above-described process is specific to the closed loop system including the particular printer and scanner. Since devices (printers or scanners) of the same model (or the same series, the same product line, the same manufacturer, etc.) will tend to have similar characteristics, the device-to-device variation within the same model being much smaller than variations between devices of different models, the process described above may be performed to establish optimum noise filter settings for a class (e.g. model, series, manufacturer, etc.) of printers and a class of scanners. Such settings may then be used in a combination of a printer from the printer class and a scanner from the scanner class. The process may be performed for many printer/scanner combinations or printer class/scanner class combinations, and the corresponding noise filter setting for each combination may be stored for future use.

Figure 4:
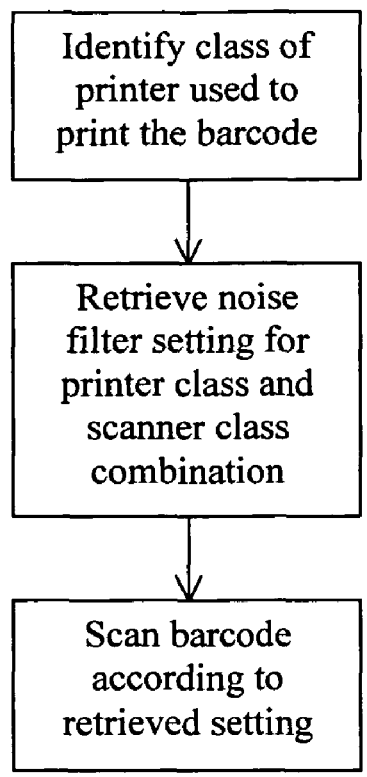
FIG. 4 is a flowchart illustrating method according to another embodiment of the present invention.

When a scanner scans a barcode, the scanner will determine (e.g. by querying the user) what printer or class of printers was used to print the barcode. The scanner will then use the stored noise filter setting for this printer/scanner combination to scan the barcode. This process is illustrated in FIG. 4.

Figure 5:
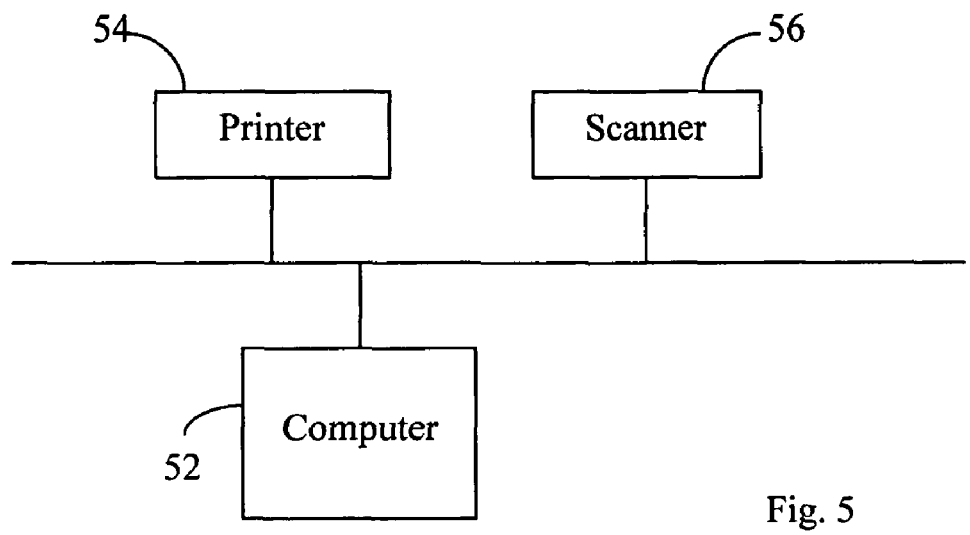
FIG. 5 schematically illustrates a system in which embodiments of the present invention may be implemented.

The methods described above may be implemented by a computer software program partially or entirely running on a computer, a scanner, and/or other data processing apparatus. FIG. 5 illustrates a system in which the methods may be implemented, including a computer 52, a printer 54 and a scanner 56 connected to each other by a network or other communication links. One embodiment of the invention is a computer 52 loaded with a program for determining optimum noise filter settings of a scanner based on input test image data and scanned test image data. The program is preferably stored in a ROM (Read Only Memory) accessed by a CPU (Central Processing Unit) of the computer, and the CPU reads the program to carry out the method for determining the optimum noise filter settings. Another embodiment of the invention is a scanner 56 having a processor and a ROM loaded with a program for scanning a test image and determining optimum noise filter setting based on input test image data and scanned test image data. Another embodiment of the invention is a scanner that stores optimum noise filter settings for a plurality of printers and applies appropriate noise filter setting to scan a barcode depending on the printer used to print the barcode. As a further another embodiment, in a case the system constitutes a so called scanner printer, in which a scanner is connected to a printer with a dedicated communication line, one of the scanner and the printer may has a CPU and a ROM storing a program for determining the optimum noise filter settings.

The present invention can be applied to black and white printers as well as color printers. The printer may be an ink jet printer, laser printed, silver-halide printer, etc.

Although the method described above is particularly useful for printing and scanning barcodes (including 1d and 2d barcodes), the method can be used in general to improve the image scanning quality for a printer/scanner closed loop system.

It will be apparent to those skilled in the art that various modification and variations can be made in the method and apparatus of the present invention without departing from the spirit or scope of the invention. Thus, it is intended that the present invention cover modifications and variations that come within the scope of the appended claims and their equivalents.

What is claimed is:

1. A method for scanning a printed image by a scanner, comprising:
   (a) storing in the scanner a plurality of optimum noise filter settings corresponding to a plurality of classes of printers;
   (b) identifying a class of a printer that was used to print the image;
   (c) retrieving, from the plurality of optimum noise filter settings, an optimum noise filter setting corresponding to the class of the printer identified in step (b); and
   (d) scanning the printed image using the optimum noise filter setting.

2. The method of claim 1, wherein in step (a), each of the stored optimum noise filter settings is common for all printers in the corresponding class of printers.

3. A scanner for scanning printed images, comprising:
   a scanning section for scanning a printed imaged; and
   a processor for controlling the scanning section, the processor storing a plurality of optimum noise filter settings corresponding to a plurality of classes of printers, identifying a class of a printer that was used to print the printed image, retrieving from the plurality of optimum noise filter settings an optimum noise filter setting corresponding to the identified class of the printer, and applying a noise filter with the optimum noise filter setting to scan the printed image.

4. The scanner of claim 3, wherein each of the stored optimum noise filter settings is common for all printers in the corresponding class of printers.

\* \* \* \* \*